United States Patent
DePue et al.

(10) Patent No.: US 11,290,439 B1
(45) Date of Patent: Mar. 29, 2022

(54) MULTIPLE APPLICATION LIST PRIORITIZATION

(71) Applicant: Snap Inc., Santa Monica, CA (US)

(72) Inventors: Charles Burson DePue, Topanga, CA (US); Patrick Mandia, Venice, CA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 402 days.

(21) Appl. No.: 16/397,849

(22) Filed: Apr. 29, 2019

Related U.S. Application Data

(60) Provisional application No. 62/828,822, filed on Apr. 3, 2019, provisional application No. 62/828,830, filed on Apr. 3, 2019.

(51) Int. Cl.
| | |
|---|---|
| *H04L 29/06* | (2006.01) |
| *G06F 9/451* | (2018.01) |
| *G06F 3/0484* | (2013.01) |
| *G06F 3/0482* | (2013.01) |
| *H04L 12/58* | (2006.01) |
| *G06F 3/04847* | (2022.01) |
| *H04L 51/046* | (2022.01) |

(52) U.S. Cl.
CPC ........ *H04L 63/0815* (2013.01); *G06F 3/0482* (2013.01); *G06F 3/04847* (2013.01); *G06F 9/451* (2018.02); *H04L 63/0853* (2013.01); *H04L 63/0884* (2013.01); *H04L 51/046* (2013.01)

(58) Field of Classification Search
CPC ............. H04L 63/0815; H04L 63/0884; H04L 63/0853; H04L 51/046; G06F 3/0482; G06F 3/04847; G06F 9/451

USPC .......................................................... 726/6
See application file for complete search history.

(56) References Cited

U.S. PATENT DOCUMENTS

| | | | |
|---|---|---|---|
| 8,667,075 B1 | 3/2014 | King et al. | |
| 8,918,529 B1 | 12/2014 | Batchu et al. | |
| 9,467,475 B2 * | 10/2016 | Faltyn | H04W 12/06 |
| 9,529,982 B2 * | 12/2016 | Heo | G06F 21/30 |

(Continued)

OTHER PUBLICATIONS

"Surprise!", [Online], Retrieved from the Internet: <https://www.snap.com/en-US/news/post/surprise>, (Oct. 3, 2013), 1 pg.

(Continued)

*Primary Examiner* — Kambiz Zand
*Assistant Examiner* — Aubrey H Wyszynski
(74) *Attorney, Agent, or Firm* — Schwegman Lundberg & Woessner, P.A.

(57) ABSTRACT

Systems and methods are disclosed for prioritizing a list of applications. The systems and methods include identifying, with a messaging application, a list of applications that are configured to share authentication information with the messaging application; determining a priority value of each application on the list of applications; generating for display, with the messaging application, a graphical user interface that represents a selection of applications from the list of applications based on the priority value of each application on the list; and for each application represented in the graphical user interface, generating for display a user-selectable option to authorize the messaging application to share authentication information with the respective application.

20 Claims, 10 Drawing Sheets

(56) References Cited

U.S. PATENT DOCUMENTS

| | | | |
|---|---|---|---|
| 9,544,288 B2 | 1/2017 | Batchu et al. | |
| 9,569,643 B2 | 2/2017 | Grkov et al. | |
| 9,710,567 B1 | 7/2017 | Lobdell et al. | |
| 9,749,311 B2 | 8/2017 | Jayanti Venkata et al. | |
| 10,063,559 B2 | 8/2018 | Evans et al. | |
| 10,474,422 B1 | 11/2019 | Venti et al. | |
| 11,050,691 B1 | 6/2021 | Depue et al. | |
| 2008/0307518 A1* | 12/2008 | Holtmanns | H04L 63/12 726/12 |
| 2010/0161635 A1 | 6/2010 | Dey | |
| 2010/0161965 A1 | 6/2010 | Selin et al. | |
| 2011/0283172 A1 | 11/2011 | Berger et al. | |
| 2012/0072507 A1 | 3/2012 | Chen et al. | |
| 2012/0197996 A1 | 8/2012 | Raman et al. | |
| 2012/0201362 A1 | 8/2012 | Crossan et al. | |
| 2012/0222083 A1 | 8/2012 | Vaha-Sipila et al. | |
| 2013/0018957 A1 | 1/2013 | Parnaby et al. | |
| 2013/0036117 A1 | 2/2013 | Fisher et al. | |
| 2013/0080224 A1 | 3/2013 | Obrien et al. | |
| 2013/0091543 A1 | 4/2013 | Wade et al. | |
| 2013/0159413 A1 | 6/2013 | Davis et al. | |
| 2013/0198275 A1 | 8/2013 | Forsblom | |
| 2013/0254290 A1 | 9/2013 | Grossman | |
| 2013/0297693 A1 | 11/2013 | Miller et al. | |
| 2013/0311906 A1 | 11/2013 | Mackin | |
| 2013/0346172 A1 | 12/2013 | Wu | |
| 2014/0006930 A1 | 1/2014 | Hollis et al. | |
| 2014/0036697 A1* | 2/2014 | Annan | H04L 67/28 370/252 |
| 2014/0068593 A1 | 3/2014 | Mcerlane et al. | |
| 2014/0215587 A1 | 7/2014 | Burch et al. | |
| 2014/0250511 A1 | 9/2014 | Kendall | |
| 2014/0297618 A1 | 10/2014 | Sherman | |
| 2014/0298260 A1 | 10/2014 | Abowd et al. | |
| 2014/0337346 A1 | 11/2014 | Barthel et al. | |
| 2014/0337628 A1 | 11/2014 | Amato | |
| 2014/0338006 A1 | 11/2014 | Grkov et al. | |
| 2014/0343994 A1 | 11/2014 | Graff et al. | |
| 2015/0058115 A1* | 2/2015 | Iwaki | G06Q 30/0277 705/14.43 |
| 2015/0121423 A1 | 4/2015 | Phipps et al. | |
| 2015/0127529 A1* | 5/2015 | Makhotin | G06Q 20/24 705/39 |
| 2015/0135288 A1 | 5/2015 | Batchu et al. | |
| 2015/0195314 A1 | 7/2015 | Reed et al. | |
| 2015/0206349 A1 | 7/2015 | Rosenthal et al. | |
| 2015/0302185 A1 | 10/2015 | Xu et al. | |
| 2015/0331856 A1 | 11/2015 | Choi et al. | |
| 2016/0006719 A1* | 1/2016 | Khalil | H04L 63/0815 726/8 |
| 2016/0007052 A1 | 1/2016 | Haitsuka et al. | |
| 2016/0057457 A1 | 2/2016 | Clements et al. | |
| 2016/0080439 A1 | 3/2016 | Bhathena et al. | |
| 2016/0088021 A1 | 3/2016 | Jayanti Venkata et al. | |
| 2016/0094501 A1 | 3/2016 | Lee et al. | |
| 2016/0149956 A1 | 5/2016 | Birnbaum et al. | |
| 2016/0295264 A1 | 10/2016 | Yanovsky | |
| 2017/0124664 A1 | 5/2017 | Savenok et al. | |
| 2017/0139658 A1* | 5/2017 | Nagata | G03G 15/5016 |
| 2017/0188070 A1 | 6/2017 | Abed | |
| 2017/0264652 A1 | 9/2017 | Karimli et al. | |
| 2017/0329955 A1 | 11/2017 | Hessler | |
| 2018/0137179 A1 | 5/2018 | Kawanabe et al. | |
| 2018/0145971 A1 | 5/2018 | Mistry | |
| 2018/0152440 A1 | 5/2018 | Hande et al. | |
| 2018/0198768 A1 | 7/2018 | Ibanez, Jr. | |
| 2018/0239637 A1* | 8/2018 | Gupta | G06Q 10/04 |
| 2018/0247077 A1 | 8/2018 | Barrett-bowen et al. | |
| 2018/0302745 A1 | 10/2018 | Rifkin et al. | |
| 2018/0336644 A1 | 11/2018 | Albertine et al. | |
| 2018/0351895 A1 | 12/2018 | Rathod | |
| 2019/0034602 A1* | 1/2019 | Votaw | G06Q 20/4016 |
| 2019/0065263 A1 | 2/2019 | Chen et al. | |
| 2019/0132492 A1 | 5/2019 | Paluri | |
| 2019/0151764 A1 | 5/2019 | Chen et al. | |
| 2019/0182554 A1 | 6/2019 | Schupak et al. | |
| 2019/0339840 A1* | 11/2019 | Park | G02B 27/017 |
| 2019/0354659 A1 | 11/2019 | Barillari et al. | |
| 2019/0379540 A1 | 12/2019 | Liderman et al. | |
| 2020/0034893 A1 | 1/2020 | Anders et al. | |
| 2020/0068262 A1 | 2/2020 | Saldana et al. | |
| 2021/0288930 A1 | 9/2021 | Depue et al. | |

OTHER PUBLICATIONS

Buscemi, Scott, "Snapchat introduces 'Stories', a narrative built with snaps", [Online] Retrieved from the Internet <https://9to5mac.com/2013/10/03/snapchat-introduces-stories-a-narrative-built-with-snaps/> (Oct. 3, 2013), 2 pgs.

Etherington, Darrell, "Snapchat Gets Its Own Timeline With Snapchat Stories, 24-Hour Photo and Video Tales", [Online], Retrieved from the Internet: <https://techcrunch.com/2013/10/03/snapchat-gets-its-own-timeline-with-Snapchat-stories-24-hour-photo-video-tales/>, (Oct. 3, 2013), 2 pgs.

Hamburger, Ellis, "Snapchat's next big thing: 'Stories' that don't just disappear", [Online], Retrieved from the Internet: <https://www.theverge.com/2013/10/3/4791934/snapchats-next-big-thing-stories-that-dont-just-disappear>, (Oct. 3, 2013), 5 pgs.

"U.S. Appl. No. 16/425,225, Notice of Allowance dated Oct. 14, 2021", 13 pgs.

"U.S. Appl. No. 16/439,293, Advisory Action dated Dec. 4, 2020", 4 pgs.

"U.S. Appl. No. 16/439,293, Examiner Interview Summary dated Jul. 14, 2020", 3 pgs.

"U.S. Appl. No. 16/439,293, Final Office Action dated Sep. 25, 2020", 12 pgs.

"U.S. Appl. No. 16/439,293, Non Final Office Action dated May 1, 2020", 9 pgs.

"U.S. Appl. No. 16/439,293, Notice of Allowance dated Feb. 22, 2021", 8 pgs.

"U.S. Appl. No. 16/439,293, Response filed Jul. 13, 2020 to Non Final Office Action dated May 1, 2020", 9 pgs.

"U.S. Appl. No. 16/439,293, Response filed Nov. 19, 2020 to Final Office Action dated Sep. 25, 2020", 12 pgs.

\* cited by examiner

MULTIPLE APPLICATION LIST PRIORITIZATION

CROSS-REFERENCE TO RELATED APPLICATIONS

This application claims the benefit of priority of Patrick Mandia et al., U.S. Provisional Patent Application No. 62/828,830, entitled "CROSS-APPLICATION MEDIA EXCHANGE." filed on Apr. 3, 2019, and Patrick Mandia et al., U.S. Provisional Patent Application No. 62/828,822, entitled "MULTIPLE APPLICATION AUTHENTICATION," filed on Apr. 3, 2019, the entireties of which are hereby incorporated by reference herein.

TECHNICAL FIELD

The present disclosure relates generally to managing authentication across multiple applications.

BACKGROUND

Modern-day user devices implement multiple applications on a given device. Users typically maintain specific accounts for each application. As such, to access a given application, the users input the credentials associated with the account for the given application. After the credentials are authenticated, the user can access various features of the given application.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
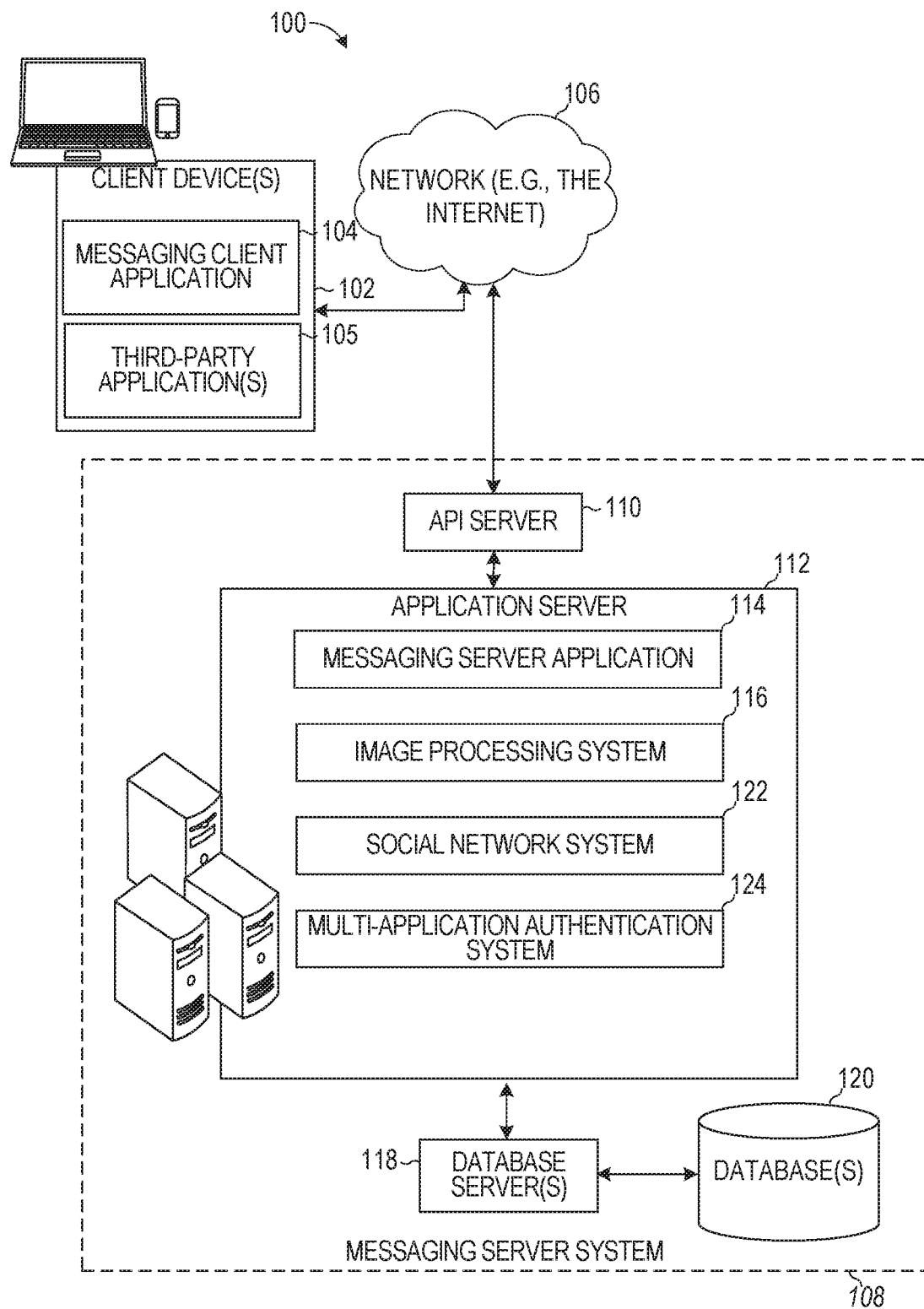
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically users maintain unique accounts for each application that is installed on their devices. To access a given application, the user has to recall their login credentials and input those credentials into the interface of the given application. After the application validates the credentials, the user gains access to the features of the application. Because of the increasing number of applications users install on their devices, remembering the credentials for each application becomes incredibly burdensome and can be discouraging to users. Sometimes users even write down their credentials for each application, which jeopardizes the user's security if those written credentials are lost or stolen.

In some instances, a user can access a given application using their account from another application. To do so, the user launches the desired application and instructs the application to retrieve the user's account credentials from another application. While this approach works well in reducing the number of credentials the user has to remember, users often forget which applications are sharing the user's account. This can subject the user to security risks if security of one of the applications has been compromised and the user does not remember if the user previously authorized sharing of the user's account with that particular application. In addition, such approaches require the user to launch each given application individually to determine whether that application is configured to share the user's account from another application. This process of figuring out which applications are configured to share the user's account is extremely tedious and time consuming for the users, resulting in waste of resources or lack of use.

The disclosed embodiments improve the efficiency of using the electronic device by providing a multi-application authentication system that provides a user with greater control over sharing authorization information between multiple applications. Specifically, according to the disclosed embodiments, a messaging application retrieves a list of applications that are installed on a user device. The messaging application searches the list of applications to identify a given application within the list that is configured to share authentication information with the messaging application. In response to identifying the given application, the messaging application displays an option to the user to authorize the messaging application to share the authentication information of the messaging application with the given application. In this way, because the authorization of sharing the authentication information of the messaging application with other applications is performed through the messaging application itself, the messaging application is able to track and maintain a list of all the applications with which the authentication information has been shared (also referred to as the connected application). The connected application can be a third-party application that is provided by an entity or organization that differs from the entity or organization that provides the messaging application.

In some embodiments, the messaging application presents a graphical user interface that lists all the applications with which the authentication information has been shared. Via the graphical user interface, the user can view the level of authentication information that is being shared with each application. The user can also disconnect or terminate sharing of the authentication information with a selected application via the graphical user interface. In some embodiments, the graphical user interface allows a user to search for and/or view a list of all the applications that are configured to share authentication information with the messaging application. From the list, the user can choose one or more application with which the messaging application is authorized to share the authentication information. In some embodiments, the messaging application determines a priority for each application on the list, such as based on a level of sponsorship or popularity of each application. The messaging application represents and/or excludes from display the applications based on the determined priority.

In response to the user selecting the one or more applications, the messaging application automatically coordinates with the selected applications to provide the authentication information to the selected applications. In this way, when the user at some later time launches a given one of the selected applications, independently of the messaging application (e.g., from a home screen of the user device), the launched application automatically logs the user into the application using the shared authentication information from the messaging application and does not require the user to input credentials to access features of the launched application.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) as well as payload data (e.g., text, audio, video, or other multimedia data).

The third-party application(s) 105 and the messaging client application 104 are applications that include a set of functions that allow the client device 102 to access the multi-application authentication system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account.

For example, the third-party application 105 can be a social networking application, a dating application, a ride or car sharing application, a shopping application, a trading application, or an imaging application. In some embodiments, the third-party application 105 is configured to share authentication information with the messaging client application 104. For example, the third-party application 105 can share authentication information with the messaging client application 104 based on the OAuth 2 flow framework.

To do so, the messaging client application 104 communicates with an authentication server an authentication token. The authentication token may include information from a user account with the messaging client application 104. The authentication token may identify uniquely the third-party application 105 and may be associated with an expiration time. The third-party application 105 communicates with the authentication server to obtain the authentication token. Using the information contained in the authentication token (e.g., a username, a password, a user address, and so forth), the third-party application 105 is able to provide the user to access to features of the third-party application 105. Namely, a user can launch the third-party application 105, and in response, the third-party application 105 communicates with the authentication server to determine whether the third-party application 105 has a valid token for the user. If the expiration time specified in the token has not yet been reached, the third-party application 105 retrieves the token and logs the user into the third-party application 105 using the information contained in the token. If the expiration time has been reached, the third-party application 105 can request that the messaging client application 104 renew the token to extend the expiration time. If the messaging client application 104 renews the token, the third-party application 105 automatically logs the user into the third-party application 105 and enables the user to access the features of the third-party application 105.

In some embodiments, the messaging client application 104 presents a graphical user interface that allows the user to view applications that have been previously authorized by the messaging client application 104 to share the authentication information from the messaging client application 104. The graphical user interface may include an option for each application that allows the user to instruct the messaging client application 104 to discontinue sharing the authentication information. In response to the user selecting the option to discontinue sharing the authentication information, the messaging client application 104 communicates with the authentication server the specific identity of the third-party application 105 that is associated with the selected option and an indication to expire the token for that application. At a later point, the user can select an option to connect the application that has been disconnected, at which time the messaging client application 104 communicates with the authentication server the specific identity of the third-party application 105 that is associated with the selected option and an indication to renew the token for that application.

In some embodiments, the messaging client application 104 presents a graphical user interface that allows the user to search for third-party applications 105 that are configured to share authentication information with the messaging client application 104. The user can enter text that represents a name of an application that the user is interested in. As the user enters text, a search is performed within a list of applications that are configured to share authentication information with the messaging client application 104. The search through the list identifies applications on the list that have titles that match the partial text input. As applications as identified, they are presented in the graphical user interface with an option to allow the user to select to connect the application. In response to receiving the user selection of such an option to connect the application, the messaging client application 104 communicates with the authentication server the specific identity of the third-party application 105 that is associated with the selected option and an indication to provide an authentication token for that application.

In some embodiments, the messaging client application 104 presents a graphical user interface that lists all the third-party applications 105 that are configured to share authentication information with the messaging client application 104. The third-party applications 105 on the list are presented in the graphical user interface with an option to allow the user to select to connect the application. In response to receiving the user selection of such an option to connect the application, the messaging client application 104 communicates with the authentication server the specific identity of the third-party application 105 that is associated with the selected option and an indication to provide an authentication token for that application. In some embodiments, a user can select a connect all option or disconnect all applications option to automatically have the messaging client application 104 generate and provide tokens to each application or revoke previously provided tokens, respectively.

In some embodiments, the messaging client application 104 determines a priority for each third-party application 105 on the list. In some embodiments, the priority is determined based on a level of sponsorship associated with each third-party application 105. For example, an entity that provides a first third-party application 105 may pay a certain amount of money to the entity that provides the messaging client application 104 corresponding to a first level of sponsorship. Another entity that provides a second third-party application 105 may pay a certain amount of money to the entity that provides the messaging client application 104 that corresponds to a second level of sponsorship and that is less than the amount corresponding to the first level of sponsorship. In such circumstances, the messaging client application 104 may determine and associate a greater priority to the first third-party application 105 than the second third-party application 105. As another example, the messaging client application 104 determines that a second third-party application 105 is more popular, has more reviews, has a better rating, or has more users than a first third-party application 105. In such circumstances, the messaging client application 104 may determine and associate a lower priority to the first third-party application 105 than the second third-party application 105.

The messaging client application 104 represents each third-party application 105 on the list based on the determined priority. For example, the messaging client application 104 presents a first third-party application 105 that is associated with a priority that is greater than a priority of a second third-party application 105 earlier in the list and earlier in the graphical user interface than the second third-party application 105. Specifically, the messaging client application 104 presents the first third-party application 105 at the top of the graphical user interface region listing the third-party applications 105 that can be connected and presents the second third-party application 105 at the bottom of the region. As another example, the messaging client application 104 presents the first third-party application 105 (having the greater priority than the second third-party application 105) with a graphical symbol, such as a border, a star, an animation, or other suitable graphical symbol to highlight and draw a user's attention to the first third-party application 105 and may exclude such a graphical symbol from being displayed with the second third-party application 105. In some implementations, a third-party application 105 that is associated with a priority that is below a certain threshold is excluded from being displayed in the graphical user interface, which prevents the user from connecting the messaging client application 104 to the third-party application 105.

In some embodiments, features of the messaging client application 104 are selectively enabled based on whether a given third-party application 105 has been connected to the messaging client application 104. For example, a feature to share media items with other applications can be in a disabled state when the given third-party application 105 has not yet been connected to the messaging client application 104. In response to the user selecting an option to share authentication information with the third-party application 105, the feature to share media items with other applications, and particularly with the third-party application 105, becomes enabled. The user can select and interact with the feature to automatically transmit to the third-party application 105 any media items that are captured, stored, and manipulated by the messaging client application 104. The third-party application 105, once connected, is configured to use an application programming interface (API) of the messaging client application 104 to display or playback any of the media items that have been transmitted and shared with the third-party application 105 by the messaging client application 104. Namely, the media items may be configured to only be played using a video or image player (decoder) of the messaging client application 104, and the API enables the third-party application 105 to access the player of the messaging client application 104 to play the media items. In this way, because playback of the media items by the third-party application 105 is controlled by the API of the messaging client application 104, the messaging client application 104 can compute metrics or a view count for each media item even when such a media item is played or accessed by the third-party application 105 outside of the messaging client application 104. Specifically, a given media item may be transmitted and shared by the messaging client application 104 with first and second third-party applications 105. If such a media item is played 100 times by users of a first third-party application 105 and 200 times by users of a second third-party application 105 through the API of the messaging client application 104, the messaging client application 104 can track and determine that the view count of the particular media item is 300 even though the media item was accessed by the first and second third-party applications 105.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the multi-application authentication system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the multi-application authentication system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The multi-application authentication system 124 manages authentication sharing by the messaging client application 104 with third-party applications 105. In some embodiments, the multi-application authentication system 124 manages the authentication sharing in accordance with the OAuth 2 flow framework. The multi-application authentication system 124 communicates with the messaging client application 104 to receive indications of which third-party applications 105 the messaging client application 104 is authorized to share authentication information. The multi-application authentication system 124 generates tokens for each of the indicated third-party applications 105 and manages expiration of such tokens. The third-party applications 105 communicate with the multi-application authentication system 124 to obtain the generated tokens to enable a user of the client device 102 to access the third-party applications 105 without creating a specific account for the third-party applications 105 and/or inputting credentials to log into the third-party applications 105.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated and hosted by a second, different entity. In some implementations, database 120 stores user data that the first entity collects about various users of a service provided by the first entity. For example, the user data includes user names, passwords, addresses, friends, activity information, preferences, videos or content consumed by the user, and so forth. The data may be provided by the users voluntarily or may be collected automatically by the first entity and stored in database 120. In some implementations, the data is provided by the user for using a particular function of the service provided by the first entity. In some cases, this same data can be used by another new function or feature or service provided by the first entity. The user may or may not be interested in the new function or feature or service provided by the first entity, and accordingly, there may be restrictions on the way in which the user's data can be used without express permission by the user. These uses are typically controlled and regulated according to privacy regulations.

Figure 2:
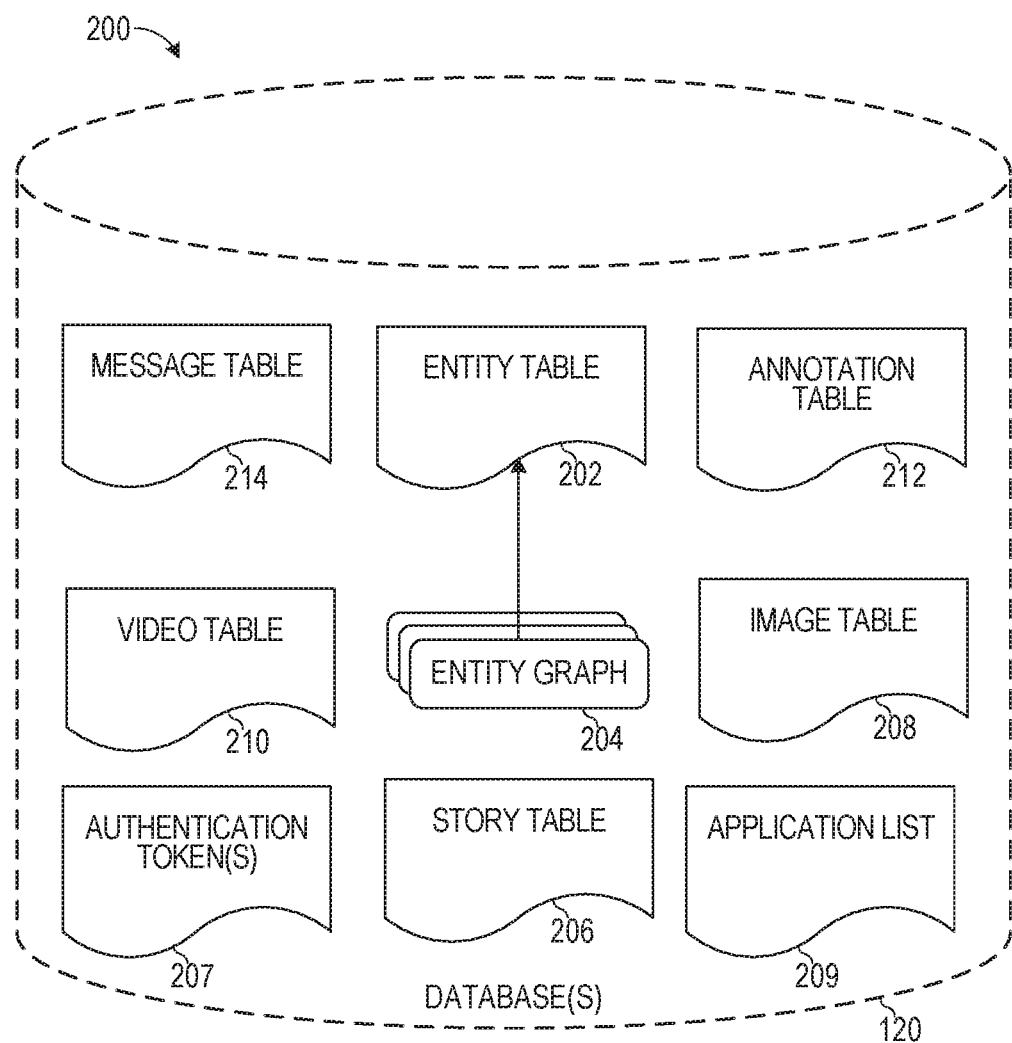
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Authentication token(s) 207 stores a list of tokens used by third-party applications 105 to provide a user of a client device 102 access to the third-party applications 105. Each token may include a list of permissions associated with a given third-party application 105, an identity (e.g., a name) of the third-party application 105, user information provided by the messaging client application 104, an expiration time, and any other suitable information. Authentication tokens 207 are generated and provided by the messaging client application 104 when a user authorizes sharing authentication information with a given third-party application 105. The messaging client application 104 can renew or update expiration times in the authentication tokens 207 when a given third-party application 105 requests renewal of the expiration time for its associated token. The messaging client application 104 can revoke or expire any given authentication token 207 when a user instructs the messaging client application 104 to disconnect an associated third-party application 105. The messaging client application 104 can revoke or expire any given authentication token 207 when an expiration time is reached and/or when fraud is detected, causing the messaging client application 104 to disconnect an associated third-party application 105.

Application list 209 stores a list of all third-party applications 105 installed on a given client device 102. As new third-party applications 105 are installed on the given client device 102, the client device 102 updates the application list 209 with the name and identity of the installed third-party application 105. Application list 209 also stores a list of all the third-party applications 105 that are configured to share authentication information with the messaging client application 104. Namely, any third-party application 105 that the messaging client application 104 determines as having the same authentication protocol as the messaging client application 104 and has been previously approved by a developer of the messaging client application 104 can be added to the list of third-party applications 105 configured to share authentication information with the messaging client application 104. Application list 209 may also store sponsorship information or a level of sponsorship of each third-party application 105. The level of sponsorship is determined based on which level of sponsorship an entity that provides a given third-party application 105 purchased from the entity that provides the messaging client application 104. Application list 209 may also store a popularity, rank, rating level, and number of users of each third-party application 105.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
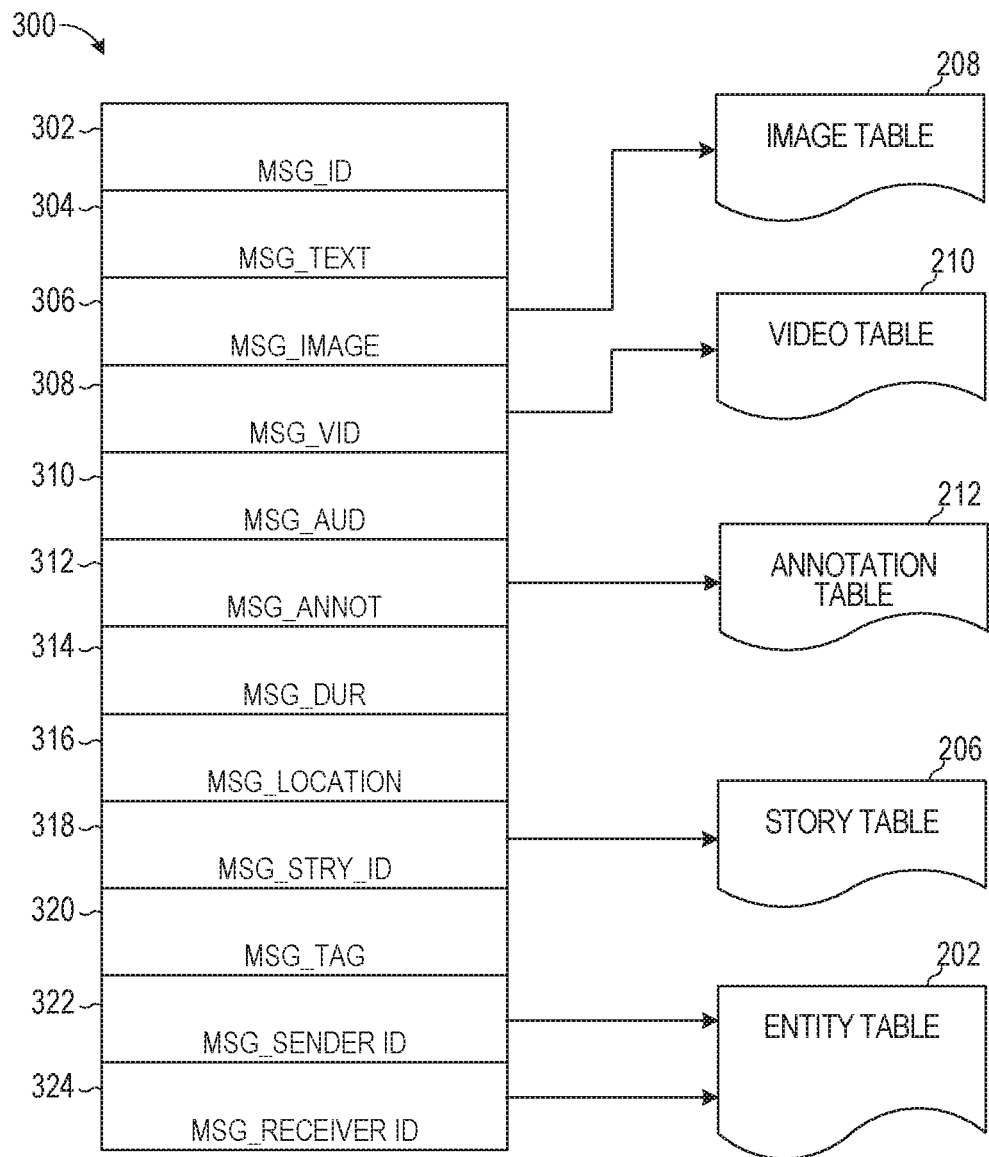
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
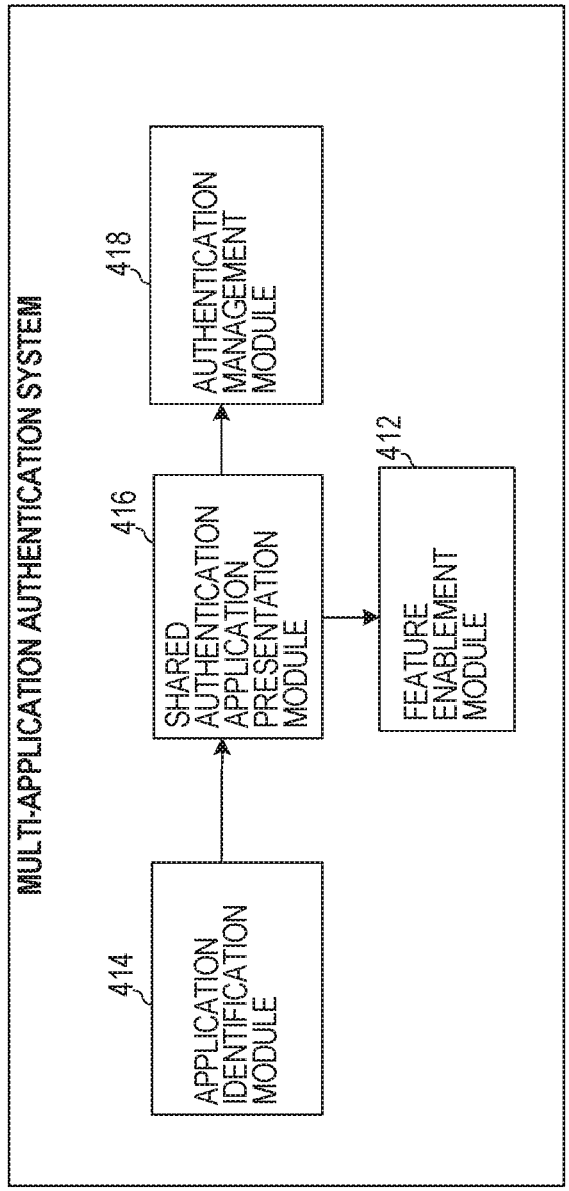
FIG. 4 is a block diagram showing an example multi-application authentication system, according to example embodiments.

FIG. 4 is a block diagram showing an example multi-application authentication system 124, according to example embodiments. Multi-application authentication system 124 includes an application identification module 414, a shared authentication application presentation module 416, a feature enablement module 412, and an authentication management module 418. The application identification module 414 communicates with a client device 102 to obtain a list of third-party applications 105 that are currently installed on the client device 102. The application identification module 414 can retrieve this list from application list 209.

The application identification module 414 retrieves a list from applications list 209 that identifies all the third-party applications 105 that are configured to share authentication information with the messaging client application 104. The application identification module 414 compares the two lists and identifies which of the installed applications on the client device 102 are also configured to share authentication information with the messaging client application 104. In some implementations, the application identification module 414, rather than comparing the two lists, can analyze configuration information for each application that is installed on the client device 102. The configuration information can be analyzed to determine whether the installed application supports sharing the authentication information with the messaging client application 104 (e.g., whether the application supports an authentication protocol that is the same or similar as the authentication protocol of the messaging client application 104).

In some embodiments, the application identification module 414 receives a user search query and identifies third-party applications 105 that are or are not installed on the client device 102 that have a name that matches the search query. The application identification module 414 determines whether the matching applications are configured to share authentication information with the messaging client application 104. If so, the application identification module 414 communicates such third-party applications 105 to the shared authentication application presentation module 416.

The application identification module 414 communicates the identified third-party applications 105 that are installed and are configured to share authentication information with the messaging client application 104 to the shared authentication application presentation module 416. In some implementations, the application identification module 414 communicates to the shared authentication application presentation module 416 applications that are not installed on the client device 102 but that are configured to share authentication information with the messaging client application 104. Namely, any application that is not on the list of installed applications but is on the list of applications configured to share authentication information with the messaging client application 104 can be identified and provided to the shared authentication application presentation module 416.

The shared authentication application presentation module 416 presents a graphical user interface on the messaging client application 104 that represents the third-party applications 105 identified by the application identification module 414. The graphical user interface may indicate to the user the third-party applications 105 that are installed on the client device and that are configured to share authentication information with the messaging client application 104. The graphical user interface includes an option for each application allowing the user to instruct the messaging client application 104 to connect to the particular third-party application 105. In response to receiving a user selection of the option, the shared authentication application presentation module 416 identifies the particular third-party application 105 to the authentication management module 418 and/or to the feature enablement module 412. The authentication management module 418 can generate a token for the particular third-party application 105 with a specified expiration time. The token can be used by the particular third-party application 105 to allow the user to access features of the third-party application 105 without logging in and without providing credentials. The third-party application 105 uses the token to identify the user and present content to the user based on the user's information.

In some embodiments, the shared authentication application presentation module 416 computes a priority for each of the identified third-party applications 105. The priority can be computed based on information associated with the third-party applications 105 obtained from the application list 209. In one example, the priority of a first third-party application 105 is set to a first value based on a first level of sponsorship of the first third-party application 105 and the priority of a second third-party application 105 is set to a second value based on a second level of sponsorship of the second third-party application 105. The first value may be lower than the second value, indicating a lower priority level if the first level of sponsorship is lower than the second level of sponsorship. The shared authentication application presentation module 416 may rank the first third-party application 105 lower in the list that is presented to a user, resulting in the first third-party application 105 being presented less prominently than the second third-party application 105.

In another example, the priority of a first third-party application 105 is set to a first value based on a first level of popularity or rating of the first third-party application 105 and the priority of a second third-party application 105 is set to a second value based on a second level of popularity or rating of the second third-party application 105. The first value may be lower than the second value indicating a lower priority level if the first level of popularity or rating is lower than the second level of popularity or rating. The shared authentication application presentation module 416 may rank the first third-party application 105 lower in the list that is presented to a user resulting in the first third-party application 105 being presented less prominently than the second third-party application 105. In some embodiments, the shared authentication application presentation module 416 determines that the priority computed for the first third-party application 105 is lower than a specified minimum threshold. In such cases, the shared authentication application presentation module 416 removes the first third-party application 105 from the list of identified third-party applications 105 and prevents presentation of the first third-party application 105 in the graphical user interface. This prevents the user from connecting the messaging client application 104 to the first third-party application 105.

In some embodiments, the shared authentication application presentation module 416 presents a graphical user interface that indicates to the user the third-party applications 105 that are installed on the client device and have been previously selected by the user to connect and share authentication information with the messaging client application 104. The graphical user interface includes an option for each application, allowing the user to instruct the messaging client application 104 to disconnect from the particular third-party application 105. In some embodiments, the shared authentication application presentation module 416 presents the third-party applications 105 in this graphical user interface based on the priority determined for each third-party application 105. For example, the shared authentication application presentation module 416 may identify a first third-party application 105 that has been previously selected by the user to connect and share authentication information with the messaging client application 104 and that is associated with a greater priority than the priority of a second first third-party application 105 that has been previously selected by the user to connect and share authentication information with the messaging client application 104. In response, the shared authentication application presentation module 416 presents the first third-party application 105 more prominently (e.g., with a particular graphical symbol or earlier in the list that is displayed, such as at the top) than the second third-party application 105.

In response to receiving a user selection of the option, the shared authentication application presentation module 416 identifies the particular third-party application 105 to the authentication management module 418 and/or to the feature enablement module 412. The authentication management module 418 can revoke a token for the particular third-party application 105 to prevent the third-party application 105 from accessing the user information contained in the token and associated with the messaging client application 104.

Authentication management module 418 can manage the tokens and authentication in accordance with the OAuth 2 flow framework.

Feature enablement module 412 identifies features of the messaging client application that are in an enabled or disabled state and that are associated with one or more third-party applications 105. Feature enablement module 412 determines that a given third-party application 105 has been selected by the user for enabling the messaging client application 104 to share authentication information with the third-party application 105. In response, the feature enablement module 412 enables the corresponding feature of the messaging client application 104 for that third-party application 105. For example, the feature enablement module 412 may enable an option on the messaging client application 104 allowing the user to share automatically or selectively media items the user generates using the messaging client application 104. In response to enabling this option, the user is presented in a graphical user interface with an option to select one or more media items that were generated using the camera features of the messaging client application 104 to the third-party application 105.

In some embodiments, the features that are available for a given third-party application 105 may be based on the priority computed for the given third-party application 105. For example, a first third-party application 105 may be associated with a greater priority than a second third-party application 105. In such cases, the messaging client application 104 may allow both the first and the second third-party applications 105 to access a given media item generated by the messaging client application 104. In response to determining that the first third-party application 105 is associated with a greater priority than the second third-party application 105, the messaging client application 104 may allow the first third-party application 105 to play back and download a copy of the given media item and may allow the second third-party application 105 to only play back the given media item but not download a copy of the given media item. As another example, in response to determining that the first third-party application 105 is associated with a greater priority than the second third-party application 105, the messaging client application 104 may allow the first third-party application 105 to play back the given media item more than a threshold number of times (e.g., five times) and may allow the second third-party application 105 to only play back the given media item less than the threshold number of times.

The feature enablement module 412 may provide an API for the third-party application 105 to utilize to enable a user to play back the selected media items on the third-party application 105. The API may also allow the third-party application 105 to download and generate a transcoded copy of the selected media items. The feature enablement module 412 may also revoke access to any previously shared media items preventing the third-party application 105 from playing or accessing the media items. For example, the access to the player (decoder) needed to play the media items may be disabled using the API which prevents the third-party application 105 from playing the media items previously provided to the third-party application 105. This way, the messaging client application 104 maintains control over sharing and playback of media items, generated by the messaging client application 105, by the third-party applications 105.

Figure 5:
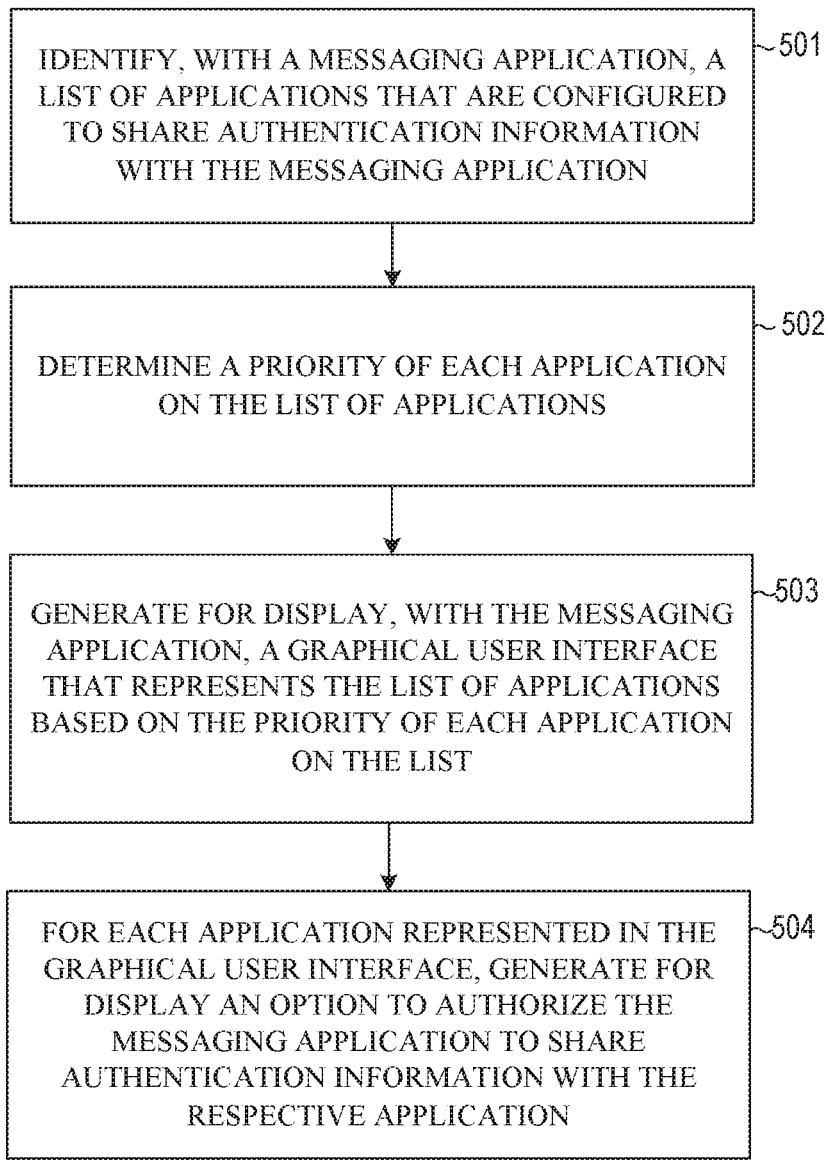
FIG. 5 is a flowchart illustrating example operations of the multi-application authentication system, according to example embodiments.

FIG. 5 is a flowchart illustrating example operations of the multi-application authentication system 124 in performing a process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the multi-application authentication system 124 identifies, with a messaging application, a list of applications that are configured to share authentication information with the messaging application. For example, application identification module 414 retrieves a list of third-party applications 105 that are currently installed on a client device 102. The application identification module 414 determines, for each third-party application 105, whether the application is configured to share authentication information with the messaging client application 104, such as if it is on a list of approved third-party applications 105 and/or if the third-party application 105 uses the same authentication protocol as the messaging client application 104. Any determined application is provided by the application identification module 414 to the shared authentication application presentation module 416.

At operation 502, the multi-application authentication system 124 determines a priority of each application on the list of applications. For example, shared authentication application presentation module 416 obtains from the application list 209 information, such as a level of sponsorship, popularity, rank, and so forth for each third-party application 105 received from the application identification module 414. The shared authentication application presentation module 416 computes a priority for each third-party application 105 based on the obtained information.

At operation 503, the multi-application authentication system 124 generates for display, with the messaging application, a graphical user interface that represents the list of applications based on the priority of each application on the list. For example, shared authentication application presentation module 416 presents the third-party applications identified by the application identification module 414 based on the priority computed for the third-party applications 105. Specifically, a first third-party application 105 associated with a higher priority than a second third-party application 105 is presented at the top of the list, and display and the second third-party application 105 is presented at the bottom of the list and display or not displayed at all.

At operation 504, the multi-application authentication system 124 for each application represented in the graphical user interface, generate for display an option to authorize the messaging application to share authentication information with the respective application. For example, shared authentication application presentation module 416 presents a list with options allowing the user to connect or disconnect a given third-party application 105.

Figure 6:
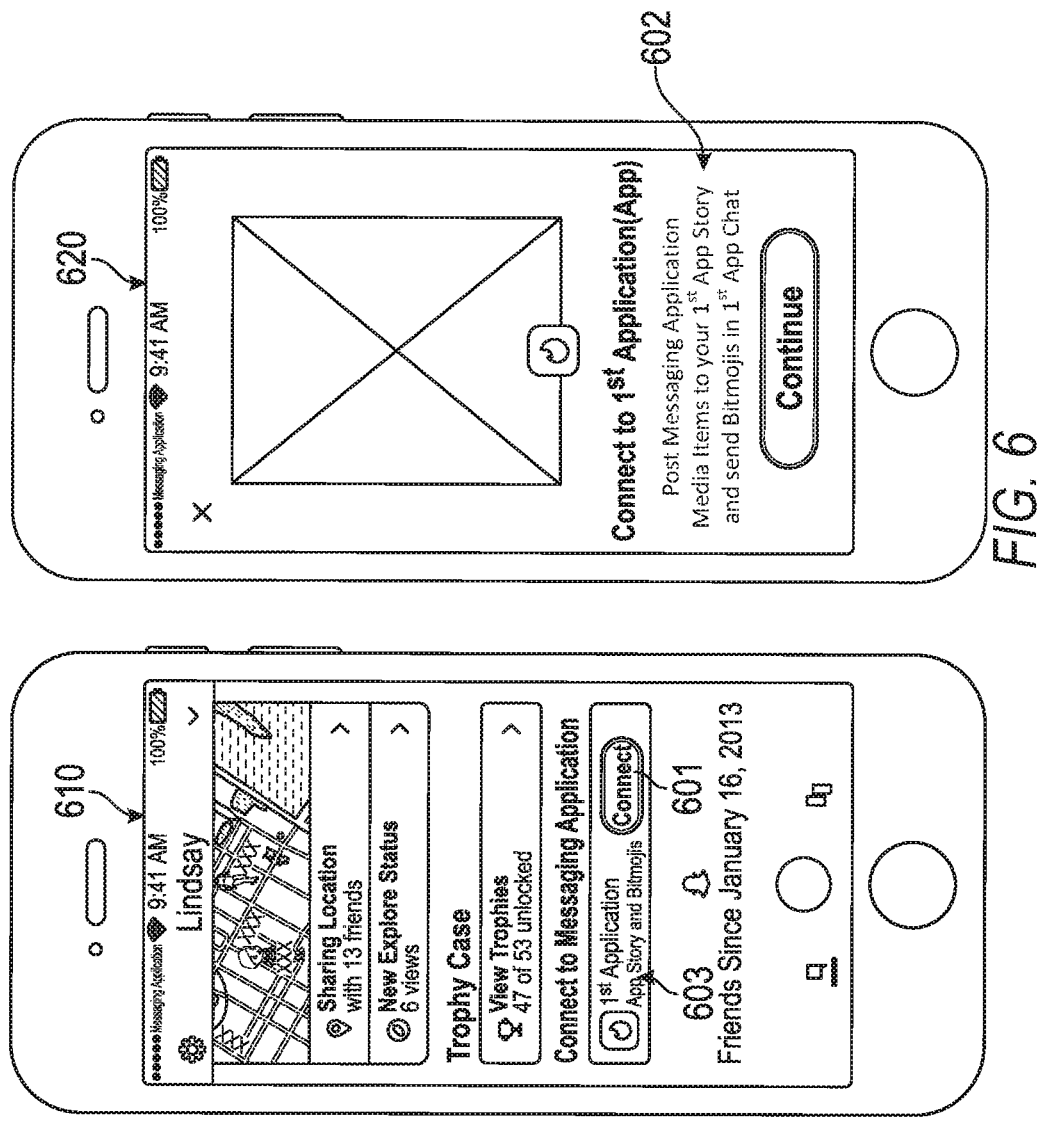
FIGS. 6-8 are illustrative inputs and outputs of the multi-application authentication system, according to example embodiments.
Figure 7:
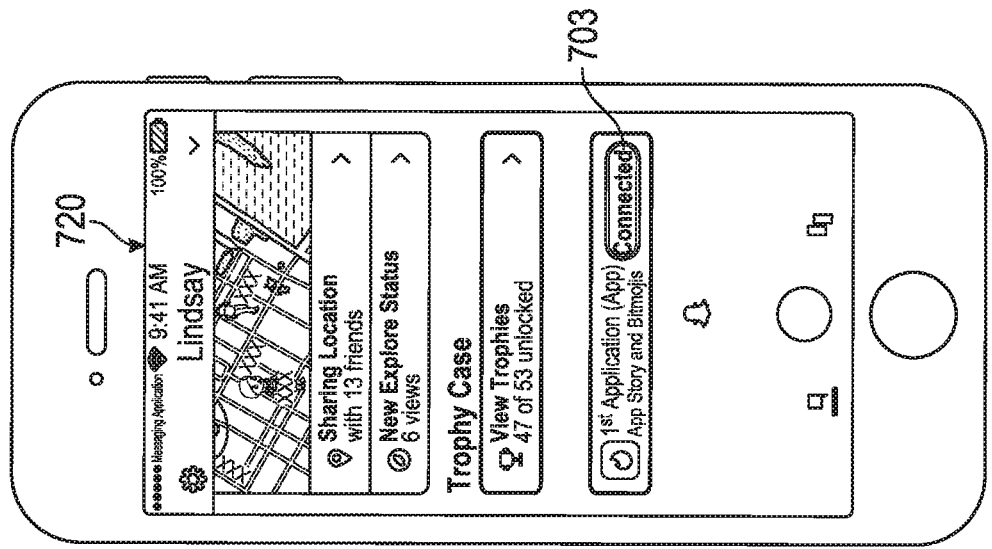
Figure 7:
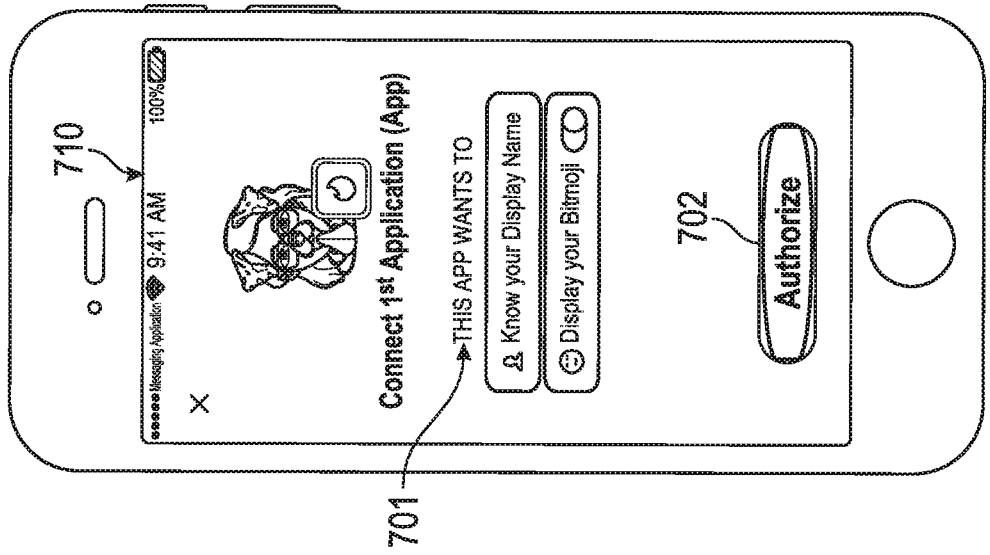
Figure 8:
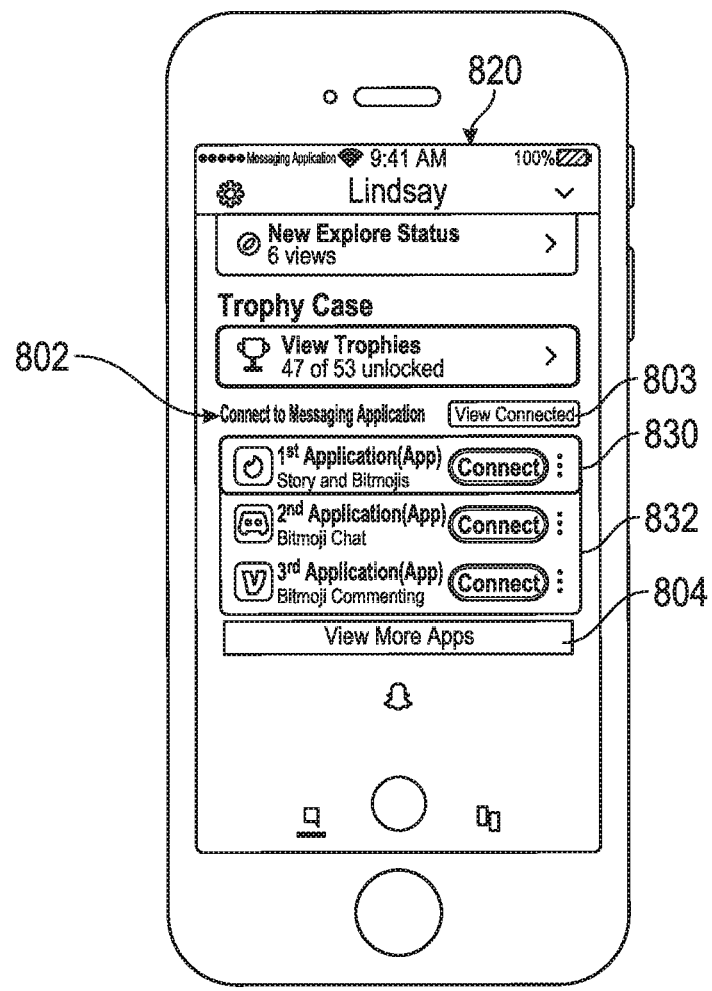

FIGS. 6-8 are illustrative inputs and outputs of the multi-application authentication system 124, according to example embodiments. As shown in graphical user interface 610 of the messaging client application 104, a first third-party application 603 is identified as being installed on the client device 102. The first third-party application 603 is determined to be configured to share authentication information with the messaging client application 104. In response, an option 601 is provided in the interface 610 allowing the user to connect the first third-party application 603 with the messaging client application 104. In response to receiving a user selection of option 601, a graphical user interface 620 of the messaging client application 104 is presented. User interface 620 provides information 602 about the first third-party application 603 and the features of the messaging client application 104 that are enabled if the user chooses to connect to the first third-party application 603. In some embodiments, the features listed in user interface 620 for the first third-party application 603 may be based on a priority of the first third-party application 603.

In some embodiments, the messaging client application 104 determines that a second third-party application 105 (which is also installed on the client device 102 and is configured to share authentication information with the messaging client application 104) is associated with a priority that is lower than the first third-party application 603. In such circumstances, the messaging client application 104 excludes from the graphical user interface 610 a representation of the second third-party application 105.

Graphical user interface 710 of the messaging client application 104 is presented in response to receiving a user indication to continue to authorize the first third-party application 603. User interface 710 indicates a level of access 701 that the first third-party application 603 requests of the authentication information (e.g., a name of the user, a location of the user, an avatar of the user, and so forth). The user can selectively enable/disable certain levels of access 701. After making the selections on the levels of access 701 the user authorizes, the user selects an authorize option 702. In response to receiving the user selection of the authorize option 702, the multi-application authentication system 124 generates a token for the first third-party application 603 with information from the user account of the messaging client application 104 in accordance with the selected levels of access 701. Graphical user interface 720 of the messaging client application 104 indicates that the first third-party application 603 is now in a connected state. Option 703 allows a user to disconnect the first third-party application 603 and revoke the token provided to the first third-party application 603.

Graphical user interface 820 of the messaging client application 104 presents a list of available third-party applications 105 that have been installed on the client device 102 but not yet connected to the messaging client application 104 in a user interface region 802. Such applications are listed in region 802 with a corresponding connect option allowing the user to selectively connect such third-party applications 105 to the messaging client application 104. The messaging client application 104 may determine that a first third-party application 830 is associated with a first priority and that a second third-party application 832 is associated with a second priority. The messaging client application 104 may determine that the first priority is greater than the second priority. In response, the messaging client application 104 presents the first third-party application 830 more prominently than the second third-party application 832 in the user interface region 802. For example, the messaging client application 104 presents a graphical symbol (such as a dark border) around the representation of the first third-party application 830 and may exclude from display the graphical symbol for the representation of the second third-party application 832.

As another example, the messaging client application 104 presents the representation of the first third-party application 830 at the top of the list in the user interface region 802 or above the representation of the second third-party application 832. As another example, the messaging client application 104 may determine that a given third-party application 105 is associated with a lower priority than three of the third-party applications represented in the user interface region 802. In such cases, the messaging client application 104 may exclude from display in the user interface region 802 a representation of the given third-party application 105. In order to view the third-party applications 105 with lower priorities than the three third-party applications represented in the user interface region 802, a user can select the view more apps option 804. In response, the other third-party applications 105 including the given third-party application 105 are presented to the user with corresponding options to connect to the third-party applications 105.

A view connected option 803 is presented allowing the user to select the option to view a list of all the third-party applications 105 that the user previously authorized to connect to the messaging client application 104. Each third-party application 105 listed in response to selection of the option 803 is presented with a disconnect option. The user can selectively disconnect the applications listed to revoke any previously provided tokens to the connected applications. A revoke all or connect all option can also be presented to simultaneously authorize the messaging client application 104 to share authentication information with all of the available third-party applications 105 or revoke access simultaneously from all of the third-party applications 105 previously authorized.

Figure 9:
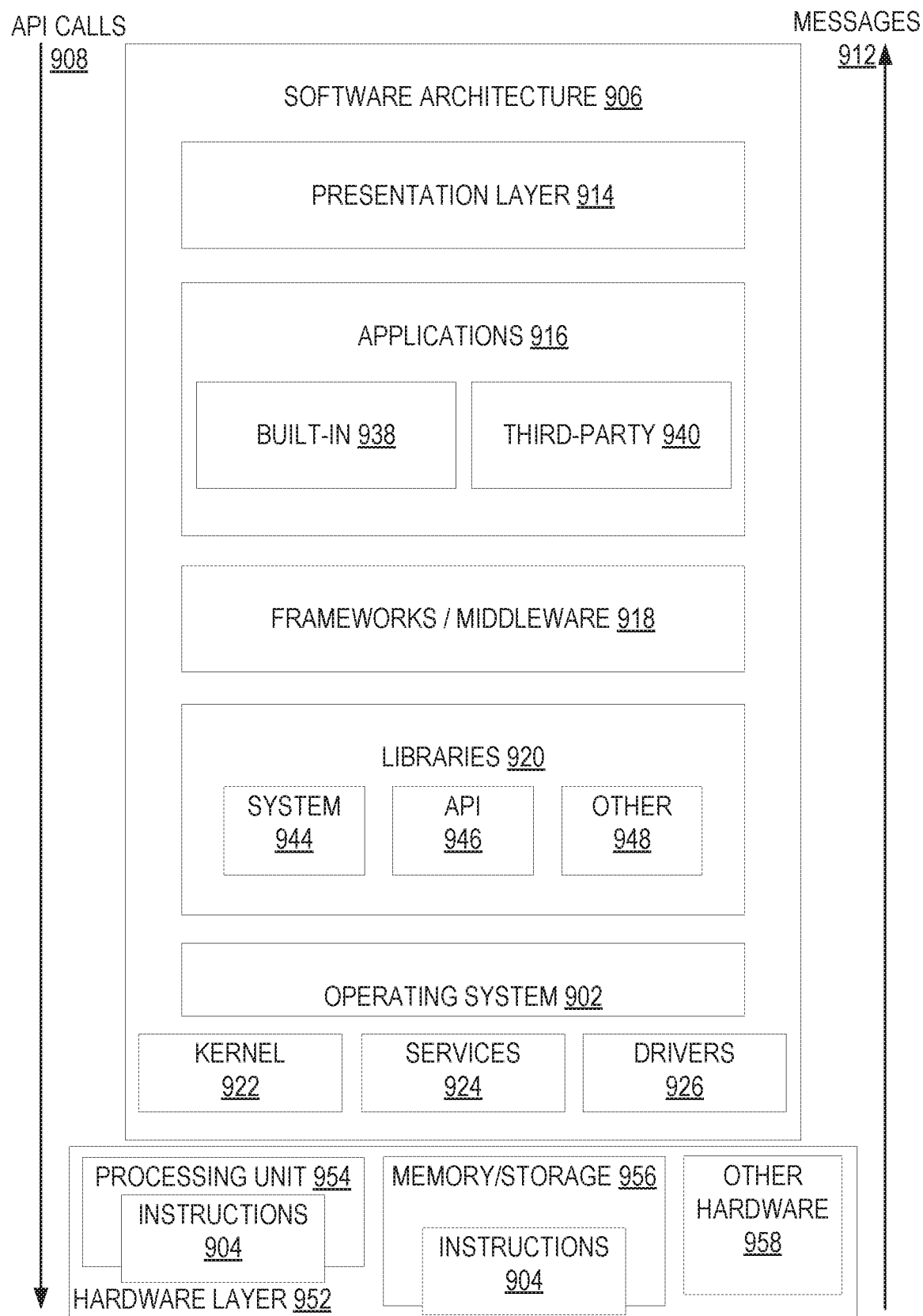
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4. H.264. MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
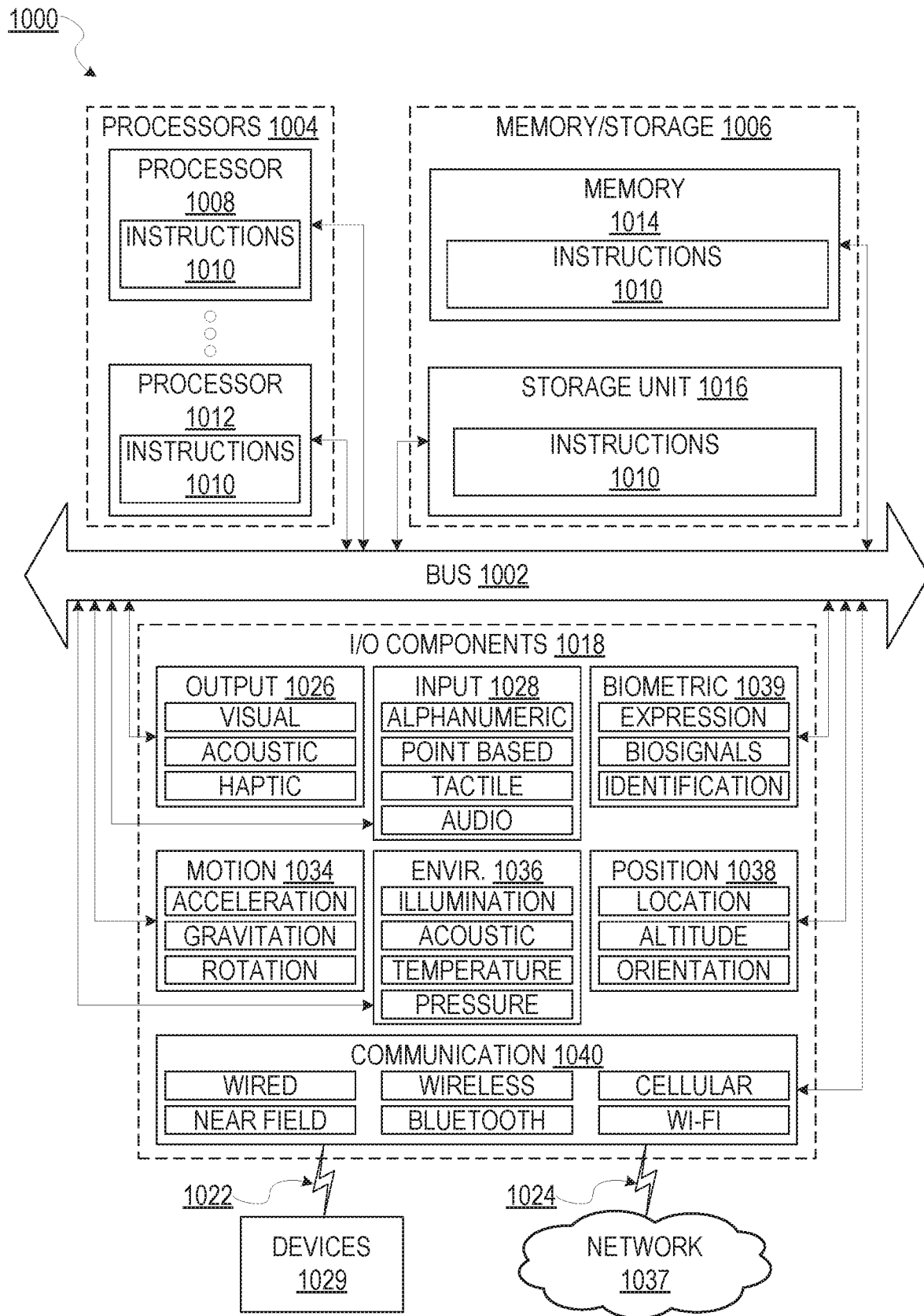
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically. FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph. MaxiCode, PDF417, Ultra Code. UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands." "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
by use of one or more computer processors executing a messaging application, performing automated operations comprising:
identifying a list of a plurality of applications that are configured to share authentication information with the messaging application, the messaging application comprising a conversation feature for sending messages between the messaging application of a user and another messaging application of a friend of the user;
determining a priority value of each application on the list of applications;
causing display of a graphical user interface that represents a selection of applications from the list of the plurality of applications based on the priority value of each application on the list; and
for each application represented in the graphical user interface, causing display of a user-selectable option to authorize the messaging application to share authentication information with the respective application, the graphical user interface comprising a visual indication of a level of authentication information being shared with a given application represented in the graphical user interface.

2. The method of claim 1 further comprising:
determining that a first application on the list is associated with a first priority value that is lower than a threshold; and
in response to determining that the first application on the list is associated with the first priority value that is lower than the threshold, excluding the first application from the selection of applications to prevent the first application from being represented in the graphical user interface.

3. The method of claim 1, further comprising generating for display on a user device via the messaging application one or more options to control the level of the authentication information that is shared by the messaging application with the given application.

4. The method of claim 1, wherein determining the priority value of each application comprises:
obtaining a level of sponsorship of each application; and
assigning the priority value to each application based on the determined level of sponsorship of each application.

5. The method of claim 1 further comprising:
receiving user input that selects the user-selectable option associated with the given application represented in the graphical user interface;
in response to receiving the user input, generating an authentication token based on a user account of the messaging application; and
transmitting the authentication token to the given application.

6. The method of claim 5 further comprising:
receiving a user request to launch the given application independently of the messaging application from a home screen of a user device; and
logging into the given application using the authentication token without requesting authorization information or login credentials from the user.

7. The method of claim 1, wherein the graphical user interface further comprising a particular option for terminating sharing of the authentication information with a selected application.

8. The method of claim 1 further comprising:
determining that a first application on the list is associated with a first priority value that is lower than a second priority value associated with a second application on the list; and
positioning the first application later in the list of applications than the second application.

9. The method of claim 1, wherein the graphical user interface comprises a region for receiving search input to search for one or more applications that are configured to share the authentication information with the messaging application.

10. The method of claim 1 further comprising:
determining a set of applications that are installed on a client device; and
generating the list of the plurality of applications based on the set of applications that are installed on the client device.

11. The method of claim 10, wherein generating the list of the plurality of applications comprises:
determining an authentication protocol of the messaging application;
accessing configuration information associated with each application in the list of the plurality of applications that indicates authentication protocols supported by each application; and
determining that the authentication protocol of the given application supports the authentication protocol of the messaging application.

12. The method of claim 1, wherein determining the priority value of each application comprises:
obtaining a popularity of each application; and
assigning the priority value to each application based on the obtained popularity of each application.

13. The method of claim 1 further comprising:
receiving user input that selects the user-selectable option to authorize the messaging application to share authentication information with an application represented in the graphical user interface; and
in response to receiving the user input, enabling a feature of the messaging application that was disabled prior to receiving the user input.

14. The method of claim 1 further comprising:
receiving user input that selects the user-selectable option to authorize the messaging application to share authentication information with the given application on the list; and
in response to receiving the user input, generating for display on a user device via the messaging application a share option allowing the user to enable the given application to access a media item generated by the messaging application.

15. The method of claim 14 further comprising accessing the media item with the given application, for display on a graphical user interface of the given application, via an Application Programming Interface (API) of the messaging application.

16. The method of claim 1 further comprising generating for display, for each of the applications represented in the graphical user interface, functionality of each respective application that is enabled when the messaging application is authorized to share the authentication information with the respective application.

17. The method of claim 1 further comprising:
receiving user input that selects the user-selectable option to authorize the messaging application to share authentication information with the given application on the list; and
in response to receiving the user input, generating for display on a user device via the messaging application options to control the level of the authentication information that is shared by the messaging application with the given application.

18. The method of claim 1 further comprising:
receiving user input that selects the user-selectable option to authorize the messaging application to share authentication information with the given application on the list; and
in response to receiving the user input, generating for display on a user device via the messaging application an indication that the given application is connected to the messaging application.

19. A system comprising:
a processor configured to perform operations comprising:
identifying, with a messaging application, a list of a plurality of applications that are configured to share authentication information with the messaging application, the messaging application comprising a conversation feature for sending messages between the messaging application of a user and another messaging application of a friend of the user;
determining a priority value of each application on the list of applications;
causing display of a graphical user interface that represents a selection of applications from the list of the plurality of applications based on the priority value of each application on the list; and
for each application represented in the graphical user interface, causing display of a user-selectable option to authorize the messaging application to share authentication information with the respective application, the graphical user interface comprising a visual indication of a level of authentication information being shared with a given application represented in the graphical user interface.

20. A non-transitory machine-readable storage medium that includes instructions that, when executed by one or more processors of a machine, cause the machine to perform operations comprising:
identifying, with a messaging application, a list of a plurality of applications that are configured to share authentication information with the messaging application, the messaging application comprising a conversation feature for sending messages between the messaging application of a user and another messaging application of a friend of the user;
determining a priority value of each application on the list of applications;
causing display of a graphical user interface that represents a selection of applications from the list of the plurality of applications based on the priority value of each application on the list; and
for each application represented in the graphical user interface, causing display of a user-selectable option to authorize the messaging application to share authentication information with the respective application, the graphical user interface comprising a visual indication of a level of authentication information being shared with a given application represented in the graphical user interface.

\* \* \* \* \*